United States Patent
Cudak et al.

(10) Patent No.: US 9,778,635 B2
(45) Date of Patent: Oct. 3, 2017

(54) EXECUTING AN ADDITIVE MANUFACTURING JOB BY A PLURALITY OF ADDITIVE MANUFACTURING PRINTERS

(71) Applicant: LENOVO ENTERPRISE SOLUTIONS (SINGAPORE) PTE. LTD., Singapore (SG)

(72) Inventors: Gary D. Cudak, Wake Forest, NC (US); Lydia M. Do, Raleigh, NC (US); Christopher J. Hardee, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 305 days.

(21) Appl. No.: 14/600,907

(22) Filed: Jan. 20, 2015

(65) Prior Publication Data
US 2016/0209819 A1    Jul. 21, 2016

(51) Int. Cl.
G06F 19/00    (2011.01)
G05B 15/02    (2006.01)
B33Y 50/02    (2015.01)

(52) U.S. Cl.
CPC .............. *G05B 15/02* (2013.01); *B33Y 50/02* (2014.12)

(58) Field of Classification Search
CPC ................................................. B29C 67/0059
USPC ......................................................... 700/119
See application file for complete search history.

(56) References Cited

U.S. PATENT DOCUMENTS

| | | |
|---|---|---|
| 8,562,324 B2 | 10/2013 | Pettis |
| 2010/0168890 A1 | 7/2010 | Fisher et al. |
| 2014/0052415 A1 | 2/2014 | Baran et al. |
| 2014/0088750 A1 | 3/2014 | Sharma et al. |

(Continued)

FOREIGN PATENT DOCUMENTS

WO    WO 2012/146943 A2    11/2012

OTHER PUBLICATIONS

Wong et al, A Review of Additive Manufacturing, 2012, Department of Mechanical and Aerospace Engineering, pp. 1-10.*

(Continued)

*Primary Examiner* — Suresh Suryawanshi
(74) *Attorney, Agent, or Firm* — Brandon C. Kennedy; Jason A. Friday; Kennedy Lenart Spraggins LLP (57) ABSTRACT

Executing an additive manufacturing job by a plurality of additive manufacturing printers, including: detecting service requirements for the additive manufacturing job; detecting service capabilities for the plurality of additive manufacturing printers; identifying, for each of a plurality of segments of the additive manufacturing job, one or more additive manufacturing printers capable of servicing the segment of the additive manufacturing job in dependence upon the service requirements for the additive manufacturing job and the service capabilities for the plurality of additive manufacturing printers; and assigning each segment of the additive manufacturing job to one of the additive manufacturing printers identified as being capable of servicing the segment of the additive manufacturing job, wherein two or more of the additive manufacturing printers are each assigned at least one distinct segment of the additive manufacturing job.

17 Claims, 5 Drawing Sheets

(56) References Cited

U.S. PATENT DOCUMENTS

| | | | |
|---|---|---|---|
| 2015/0045928 A1* | 2/2015 | Perez | B29C 67/0088 700/110 |
| 2015/0269290 A1* | 9/2015 | Nelaturi | G06F 17/5009 703/6 |
| 2016/0136898 A1* | 5/2016 | Jang | B29C 67/0088 700/98 |
| 2016/0167310 A1* | 6/2016 | Lee | B29C 67/0088 700/98 |
| 2016/0311159 A1* | 10/2016 | Spanier | B29C 67/0055 |

OTHER PUBLICATIONS

Boots Industries, "Salvaging Interrupted 3D Prints (Repetier-Host)", 3D Printing, Articles, BootsIndustries.com (online publication), accessed Jun. 2014, 4 pages, URL: http://bootsindustries.com/portfolio-item/salvaging-interrupted-3d-prints-repetier-host/.
McCue, "3D Printing Industry Will Reach $3.1 Billion Worldwide by 2016", Forbes.com (online publication), Mar. 2012, 3 pages, URL: http://www.forbes.com/sites/tjmccue/2012/03/27/3d-printing-industry-will-reach-3-1-billion-worldwide-by-2016/.

* cited by examiner

EXECUTING AN ADDITIVE MANUFACTURING JOB BY A PLURALITY OF ADDITIVE MANUFACTURING PRINTERS

BACKGROUND OF THE INVENTION

Field of the Invention

The field of the invention is executing an additive manufacturing job by a plurality of additive manufacturing printers.

Description of Related Art 3D printing, also referred to as additive manufacturing, involves the use of industrial robots designed to produce physical, three-dimensional objects. The production of such objects by such industrial robots, referred to as 3D printers, is frequently time consuming. As 3D printing advances and becomes more heavily utilized, the complexity of items that can be created by 3D printing will increase, and the time required to produce such items will also increase.

SUMMARY OF THE INVENTION

Methods, apparatuses, and products for executing an additive manufacturing job by a plurality of additive manufacturing printers, including: detecting service requirements for the additive manufacturing job; detecting service capabilities for the plurality of additive manufacturing printers; identifying, for each of a plurality of segments of the additive manufacturing job, one or more additive manufacturing printers capable of servicing the segment of the additive manufacturing job in dependence upon the service requirements for the additive manufacturing job and the service capabilities for the plurality of additive manufacturing printers; and assigning each segment of the additive manufacturing job to one of the additive manufacturing printers identified as being capable of servicing the segment of the additive manufacturing job, wherein two or more of the additive manufacturing printers are each assigned at least one distinct segment of the additive manufacturing job.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Example methods, apparatuses, and products for executing an additive manufacturing job by a plurality of additive manufacturing printers (218, 220, 222) in accordance with the present invention are described with reference to the accompanying drawings, beginning with FIG. 1. The additive manufacturing printers (218, 220, 222) depicted in FIG. 1 may be embodied, for example, as industrial robots configured to carry out additive processes that result in the printing of a three-dimensional object. Such additive processes are used to lay down successive layers of material under computer control, thereby resulting in the printing of a three-dimensional object. Such three-dimensional objects that are additively manufactured can be of almost any shape or geometry, and are produced from a 3D model or other electronic data source.

The additive processes that are performed by the additive manufacturing printers (218, 220, 222) to lay down successive layers of material can be distinct as one additive process may deposit layers differently than another additive process, one additive process may deposit layers using different materials than another additive process, and so on. For example, one additive process may melt or soften material to produce the layers while another additive process cures liquid materials using different sophisticated technologies to produce the layers. Readers will appreciate that each of the additive manufacturing printers (218, 220, 222) may be configured to perform different additive processes, and as such, each of the additive manufacturing printers (218, 220, 222) may be configured to produce of objects in different ways using different materials.

Figure 1:
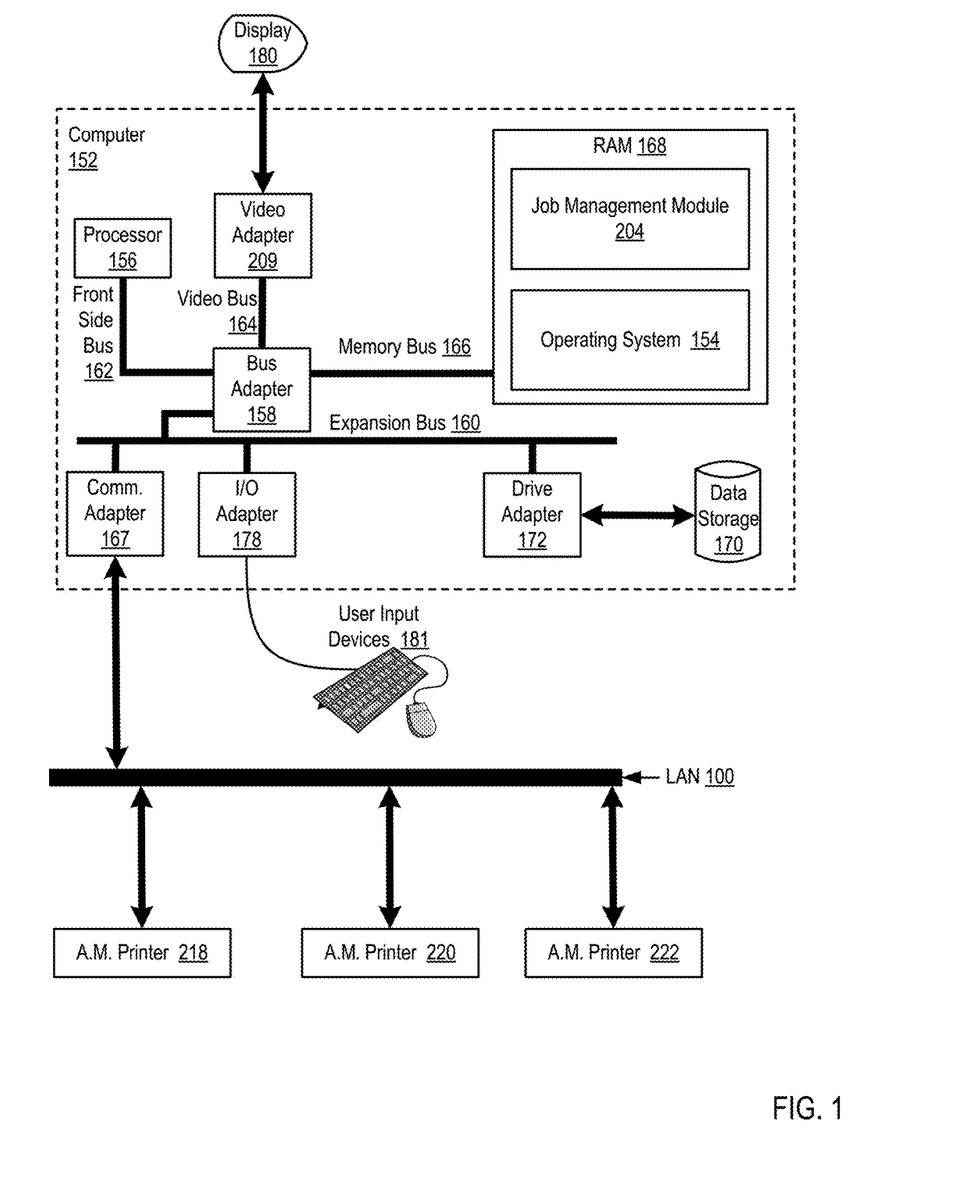
FIG. 1 sets forth a block diagram of automated computing machinery comprising an example computer useful in executing an additive manufacturing job by a plurality of additive manufacturing printers according to embodiments of the present invention.

FIG. 1 sets forth a block diagram of automated computing machinery comprising an example computer (152) useful in executing an additive manufacturing job by a plurality of additive manufacturing printers according to embodiments of the present invention. The computer (152) of FIG. 1 includes at least one computer processor (156) or 'CPU' as well as random access memory (168) (RAM') which is connected through a high speed memory bus (166) and bus adapter (158) to processor (156) and to other components of the computer (152).

Stored in RAM (168) is a job management module (204), a module of computer program instructions for executing an additive manufacturing job by a plurality of additive manufacturing printers (218, 220, 222) according to embodiments of the present invention. The job management module (204) may be configured to execute an additive manufacturing job by a plurality of additive manufacturing printers (218, 220, 222) by detecting service requirements for the additive manufacturing job. An additive manufacturing job represents a request for one or more of the additive manufacturing printers (218, 220, 222) to produce one or more physical, three-dimensional objects. The additive manufacturing job may be embodied as a message or other data structure that is received by the job management module (204) over a data communications network (100) and includes information describing one or more physical, three-dimensional objects that are to be printed using an additive manufacturing printer (218, 220, 222). Such information describing one or more physical, three-dimensional objects that are to be printed using an additive manufacturing printer (218, 220, 222) may be embodied, for example, as a file that is constructed in accordance with the Additive Manufacturing File Format ('AMF') and attached to the message that represents the additive manufacturing job.

Such an AMF file may include a geometrical specification of the physical objects that are to be printed using one or more object elements in the AMF file, a color specification of the physical objects that are to be printed using one or more color elements in the AMF file, a material specification of the physical objects that are to be printed using one or more material elements in the AMF file. As such, some service requirements for the additive manufacturing job may be detected by parsing elements of the AMF file that describe physical attributes of the physical objects that are to be printed. The AMF file may also include metadata associated with the physical objects that are to be printed using one or more metadata elements in the AMF file. Some service requirements for the additive manufacturing job such as, for example, a desired completion time for completing the additive manufacturing job, a desired start time for starting the additive manufacturing job, and other service requirements that do not describe the physical attributes of the objects to be printed may be detected by parsing metadata elements of the AMF file. The job management module (204) may therefore detect service requirements for the additive manufacturing job by extracting the service requirements from information such as an AMF file attached to a message that contains the additive manufacturing job.

The job management module (204) may be further configured to execute an additive manufacturing job by a plurality of additive manufacturing printers (218, 220, 222) by detecting service capabilities for the plurality of additive manufacturing printers (218, 220, 222). The service capabilities for a particular additive manufacturing printer (218, 220, 222) represent the extent to which a particular additive manufacturing printer (218, 220, 222) can produce physical, three-dimensional objects. In particular, the service capabilities for a particular additive manufacturing printer (218, 220, 222) can represent the extent to which a particular additive manufacturing printer (218, 220, 222) can produce the physical, three-dimensional objects whose production is requested in the additive manufacturing job. A particular service capability may specify, for example, the amount of time that would be required for a particular additive manufacturing printer (218, 220, 222) to complete the additive manufacturing job, the amount of time that would be required for a particular additive manufacturing printer (218, 220, 222) to complete one or more portions of the additive manufacturing job, the type of materials that are available for use by a particular additive manufacturing printer (218, 220, 222) to complete the additive manufacturing job, the amount of time required to complete other additive manufacturing jobs before a particular additive manufacturing printer (218, 220, 222) is available to begin one or more portions of the additive manufacturing job, the resolution capabilities of a particular additive manufacturing printer (218, 220, 222), the thickness of each layer that can be printed by a particular additive manufacturing printer (218, 220, 222), and so on.

The job management module (204) may detect service capabilities for the plurality of additive manufacturing printers (218, 220, 222) by requesting the service capabilities from each of the plurality of additive manufacturing printers (218, 220, 222) via a plurality of messages exchanged over a data communications network (100) between the job management module (204) and each of the additive manufacturing printers (218, 220, 222), by retrieving such information from a network-connected centralized repository that contains information identifying the service capabilities of each of the plurality of additive manufacturing printers (218, 220, 222), by receiving user input from a system administrator or other user identifying the service capabilities from each of the plurality of additive manufacturing printers (218, 220, 222), and so on.

The job management module (204) may be further configured to execute an additive manufacturing job by a plurality of additive manufacturing printers (218, 220, 222) by identifying, for each of a plurality of segments of the additive manufacturing job, one or more additive manufacturing printers (218, 220, 222) capable of servicing the segment of the additive manufacturing job. Each segment of the additive manufacturing job represents some portion of the additive manufacturing job, where executing each segment of the additive manufacturing job results in executing the entire additive manufacturing job.

Consider a first example in which the additive manufacturing job includes request for one or more of the additive manufacturing printers (218, 220, 222) to produce a mirror that includes a reflective coating applied to a substrate. In such an example, executing the first segment of the additive manufacturing job would result in the production of the substrate while executing the second segment of the additive manufacturing job would result in the production of the reflective coating being applied on the substrate. Executing each segment of the additive manufacturing job would result in the production of the mirror, such that the entire additive manufacturing job has been executed by the additive manufacturing printers (218, 220, 222).

Consider a second example in which the additive manufacturing job is a batch job that includes a request for one or more of the additive manufacturing printers (218, 220, 222) to produce two plastic balls. In such an example, executing the first segment of the additive manufacturing job would result in the production of the first plastic ball and executing the second segment of the additive manufacturing job would result in the production of the second plastic ball. Executing each segment of the additive manufacturing job would result in the production of two plastic balls, such that the entire additive manufacturing job has been carried out by the additive manufacturing printers (218, 220, 222).

The job management module (204) identifies, for each of a plurality of segments of the additive manufacturing job, one or more additive manufacturing printers (218, 220, 222) capable of servicing the segment of the additive manufacturing job in dependence upon the service requirements for the additive manufacturing job and the service capabilities for the plurality of additive manufacturing printers (218, 220, 222). Identifying one or more additive manufacturing printers (218, 220, 222) capable of servicing a particular segment of the additive manufacturing job is carried out in dependence upon the service requirements for the additive manufacturing job and the service capabilities for the plurality of additive manufacturing printers (218, 220, 222) as the service capabilities for a particular additive manufacturing printer (218, 220, 222) may be compared to the service requirements for the additive manufacturing job to determine whether the particular additive manufacturing printer (218, 220, 222) can execute a particular segment of the additive manufacturing job in accordance with the may be compared to the service requirements for the service requirements for the additive manufacturing job.

Consider an example in which the service requirements for the additive manufacturing job indicate that a physical, three-dimensional object that is to be produced by executing the additive manufacturing job will be made of rubber. In such an example, the service capabilities for each additive manufacturing printer (218, 220, 222) may be examined to determine whether the additive manufacturing printer (218, 220, 222) can print using rubber. Those additive manufacturing printers (218, 220, 222) that can print using rubber may be identified as being capable of servicing the segment of the additive manufacturing job. Likewise, those additive manufacturing printers (218, 220, 222) that cannot print using rubber will not be identified as being capable of servicing the segment of the additive manufacturing job.

Readers will appreciate that additional service capabilities for a particular additive manufacturing printer (218, 220, 222) may be compared to additional service requirements for the additive manufacturing job to determine whether the particular additive manufacturing printer (218, 220, 222) can execute a particular segment of the additive manufacturing job in accordance with the service requirements for the additive manufacturing job. For example, if the service requirements for the additive manufacturing job specify a desired completion time for the additive manufacturing job, only the additive manufacturing printers (218, 220, 222) that can execute the additive manufacturing job within the desired completion time may be identified as being capable of servicing the segment of the additive manufacturing job.

The job management module (204) may be further configured to execute an additive manufacturing job by a plurality of additive manufacturing printers (218, 220, 222) by assigning each segment of the additive manufacturing job to one of the additive manufacturing printers (218, 220, 222) identified as being capable of servicing the segment of the additive manufacturing job. Assigning each segment of the additive manufacturing job to one of the additive manufacturing printers (218, 220, 222) identified as being capable of servicing the segment of the additive manufacturing job may be carried out by selecting, from the additive manufacturing printers (218, 220, 222) identified as being capable of servicing the segment of the additive manufacturing job, the additive manufacturing printer (218, 220, 222) with the best performance metrics. For example, the additive manufacturing printer (218, 220, 222) with the highest job throughput may be assigned a segment, the additive manufacturing printer (218, 220, 222) with the highest resolution may be assigned a segment, and so on. Alternatively, assigning each segment of the additive manufacturing job to one of the additive manufacturing printers (218, 220, 222) identified as being capable of servicing the segment of the additive manufacturing job may be carried out by selecting, from the additive manufacturing printers (218, 220, 222) identified as being capable of servicing the segment of the additive manufacturing job, additive manufacturing printers (218, 220, 222) so as to distribute workloads and avoid prematurely wearing out the additive manufacturing printers (218, 220, 222). For example, the least recently used additive manufacturing printer (218, 220, 222) may be assigned a segment, the least frequently used additive manufacturing printer (218, 220, 222) may be assigned a segment, and so on. Readers will appreciate that assigning each segment of the additive manufacturing job to one of the additive manufacturing printers (218, 220, 222) identified as being capable of servicing the segment of the additive manufacturing job may be carried out in a variety of ways to implement a variety of objectives according to embodiments of the present invention.

In the example system depicted in FIG. 1, two or more of the additive manufacturing printers (218, 220, 222) are each assigned at least one distinct segment of the additive manufacturing job. In such a way, execution of the additive manufacturing job may be distributed across multiple additive manufacturing printers (218, 220, 222). By distributing the execution of the additive manufacturing job across multiple additive manufacturing printers (218, 220, 222), a wide array of benefits may be achieved. For example, the additive manufacturing job may be completed in less time as different segments are executed concurrently, the three-dimensional object that is produced by executing the additive manufacturing job (202) may be of a higher quality as segments can be intelligently distributed to the additive manufacturing printer (218, 220, 222) that can best execute the segment, the wear and tear on specific additive manufacturing printers (218, 220, 222) may be reduced as workload is distributed across other additive manufacturing printers (218, 220, 222), and so on.

Also stored in RAM (168) is an operating system (154). Operating systems useful executing an additive manufacturing job by a plurality of additive manufacturing printers (218, 220, 222) according to embodiments of the present invention include UNIX™ Linux™ Microsoft XP™ AIX™ IBM's i5/OS™ and others as will occur to those of skill in the art. The operating system (154) and the job management module (204) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for executing an additive manufacturing job by a plurality of additive manufacturing printers (218, 220, 222) according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers, such as the additive manufacturing printers (218, 220, 222), and for data communications with a data communications network (100). As such, the additive manufacturing printers (218, 220, 222) may include data communications adapters or otherwise be coupled to a computer that includes data communications adapters. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for executing an additive manufacturing job by a plurality of additive manufacturing printers (218, 220, 222) according to embodiments of the present invention include modems for wired dial-up communications, Ethernet (IEEE 802.3) adapters for wired data communications network communications, and 802.11 adapters for wireless data communications network communications.

Readers will appreciate that the computer (152) of FIG. 1 may be configured to communicate with the additive manufacturing printers (218, 220, 222) through the use of the communications adapter (167) over the data communications network (100). In such an example, each of the additive manufacturing printers (218, 220, 222) may also include communications adapters such the computer (152) and the additive manufacturing printers (218, 220, 222) may exchange data packets over the data communications network (100). In alternative embodiments, the computer (152) may be coupled directly to each of the additive manufacturing printers (218, 220, 222) via one or more data communications cables or other means to each data between the computer (152) and the additive manufacturing printers (218, 220, 222).

Figure 2:
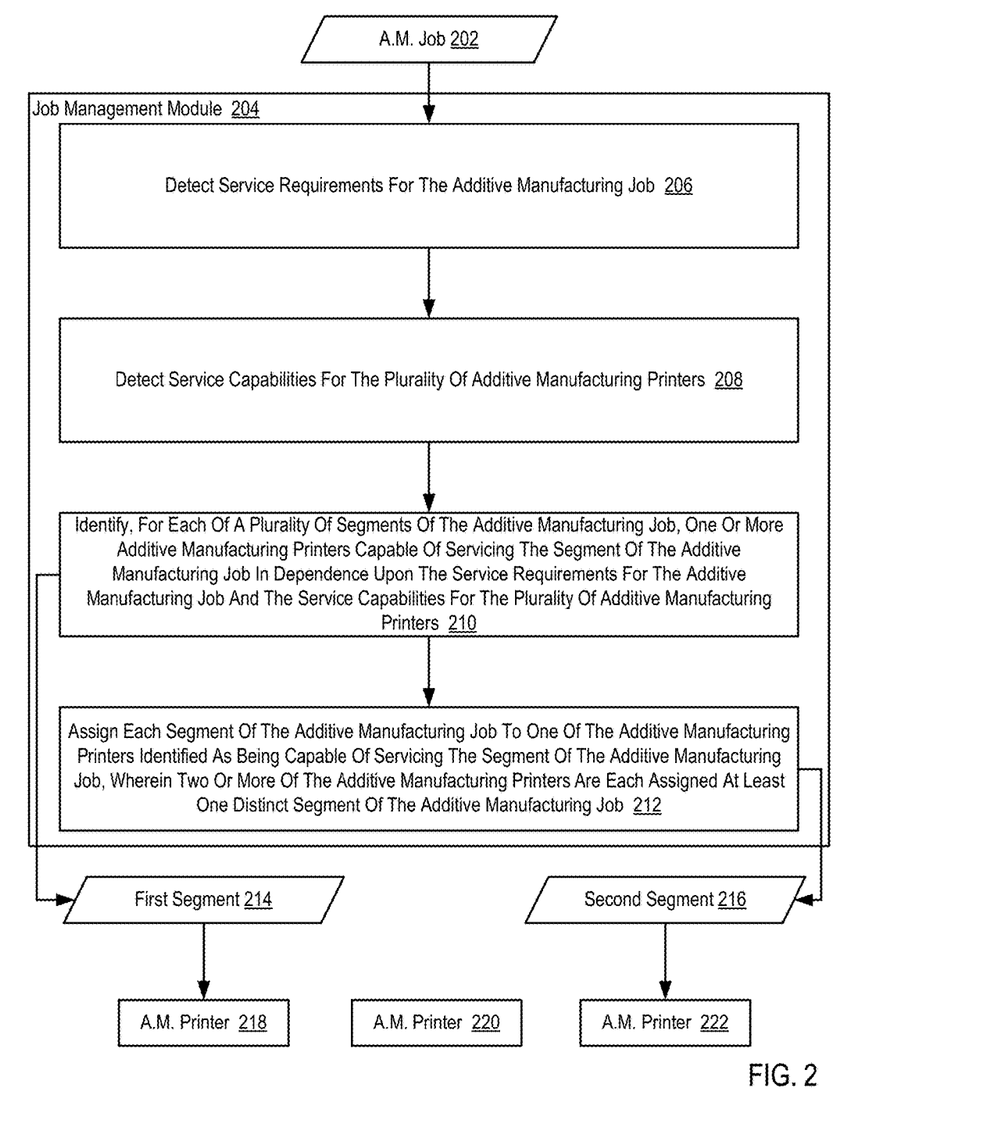
FIG. 2 sets forth a flow chart illustrating an example method for executing an additive manufacturing job by a plurality of additive manufacturing printers according to embodiments of the present invention.

For further explanation, FIG. 2 sets forth a flow chart illustrating an example method for executing an additive manufacturing job by a plurality of additive manufacturing printers (218, 220, 222) according to embodiments of the present invention. The additive manufacturing printers (218, 220, 222) depicted in FIG. 2 may be embodied, for example, as industrial robots configured to carry out additive processes that result in the printing of a three-dimensional object. Such additive processes are used to lay down successive layers of material under computer control, thereby resulting in the printing of a three-dimensional object. Such three-dimensional objects that are additively manufactured can be of almost any shape or geometry, and are produced from a 3D model or other electronic data source.

The additive processes that are performed by the additive manufacturing printers (218, 220, 222) to lay down successive layers of material can be distinct as one additive process may deposit layers differently than another additive process, one additive process may deposit layers using different materials than another additive process, and so on. For example, one additive process may melt or soften material to produce the layers while another additive process cures liquid materials using different sophisticated technologies to produce the layers. Readers will appreciate that each of the additive manufacturing printers (218, 220, 222) may be configured to perform different additive processes, and as such, each of the additive manufacturing printers (218, 220, 222) may be configured to produce of objects in different ways using different materials.

The example method depicted in FIG. 2 includes detecting (206) service requirements for the additive manufacturing job (202). The additive manufacturing job (202) depicted in FIG. 2 represents a request for one or more of the additive manufacturing printers (218, 220, 222) to produce one or more physical, three-dimensional objects. The additive manufacturing job (202) may be embodied as a message or other data structure that includes information describing one or more physical, three-dimensional objects that are to be printed using an additive manufacturing printer (218, 220, 222). Such information describing one or more physical, three-dimensional objects that are to be printed using an additive manufacturing printer (218, 220, 222) may be embodied, for example, as a file that is constructed in accordance with the AMF and attached to the message that represents the additive manufacturing job (202).

In the example method depicted in FIG. 2, such an AMF file may include a geometrical specification of the physical objects that are to be printed using one or more object elements in the AMF file, a color specification of the physical objects that are to be printed using one or more color elements in the AMF file, a material specification of the physical objects that are to be printed using one or more material elements in the AMF file. As such, some service requirements for the additive manufacturing job (202) may be detected (206) by parsing elements of the AMF file that describe physical attributes of the physical objects that are to be printed. The AMF file may also include metadata associated with the physical objects that are to be printed using one or more metadata elements in the AMF file. Some service requirements for the additive manufacturing job (202) such as, for example, a desired completion time for completing the additive manufacturing job (202), a desired start time for starting the additive manufacturing job (202), and other service requirements that do not describe the physical attributes of the objects to be printed may be detected (206) by parsing metadata elements of the AMF file. Detecting (206) service requirements for the additive manufacturing job (202) may be therefore be carried out by extracting the service requirements from information such as an AMF file contained in the additive manufacturing job (202).

The example method depicted in FIG. 2 also includes detecting (208) service capabilities for the plurality of additive manufacturing printers (218, 220, 222). The service capabilities for a particular additive manufacturing printer (218, 220, 222) represent the extent to which a particular additive manufacturing printer (218, 220, 222) can produce physical, three-dimensional objects. In particular, the service capabilities for a particular additive manufacturing printer (218, 220, 222) can represent the extent to which a particular additive manufacturing printer (218, 220, 222) can produce the physical, three-dimensional objects whose production is requested in the additive manufacturing job (202). A particular service capability may specify, for example, the amount of time that would be required for a particular additive manufacturing printer (218, 220, 222) to complete the additive manufacturing job (202), the amount of time that would be required for a particular additive manufacturing printer (218, 220, 222) to complete one or more portions (214, 216) of the additive manufacturing job (202), the type of materials that are available for use by a particular additive manufacturing printer (218, 220, 222) to complete the additive manufacturing job (202), the amount of time required to complete other additive manufacturing jobs before a particular additive manufacturing printer (218, 220, 222) is available to begin one or more portions (214, 216) of the additive manufacturing job (202), the resolution capabilities of a particular additive manufacturing printer (218, 220, 222), the thickness of each layer that can be printed by a particular additive manufacturing printer (218, 220, 222), and so on.

In the example method depicted in FIG. 2, detecting (208) service capabilities for the plurality of additive manufacturing printers (218, 220, 222) may be carried out by requesting the service capabilities from each of the plurality of additive manufacturing printers (218, 220, 222), by retrieving such information from a centralized repository that contains information identifying the service capabilities of each of the plurality of additive manufacturing printers (218, 220, 222), by receiving user input from a system administrator or other user identifying the service capabilities from each of the plurality of additive manufacturing printers (218, 220, 222), and so on.

The example method depicted in FIG. 2 also includes identifying (210), for each of a plurality of segments (214, 216) of the additive manufacturing job (202), one or more additive manufacturing printers (218, 220, 222) capable of servicing the segment (214, 216) of the additive manufacturing job (202). Each segment (214, 216) of the additive manufacturing job (202) represents some portion of the additive manufacturing job (202), where carrying out each segment (214, 216) of the additive manufacturing job (202) results in carrying out the entire additive manufacturing job (202).

Consider a first example in which the additive manufacturing job (202) includes a request for one or more of the additive manufacturing printers (218, 220, 222) to produce a mirror that includes a reflective coating applied to a substrate. In such an example, the first segment (214) of the additive manufacturing job (202) would result in the production of the substrate while the second segment (216) of the additive manufacturing job (202) would result in the production of the reflective coating being applied on the substrate. Carrying out each segment (214, 216) of the additive manufacturing job (202) would result in the production of the mirror, such that the entire additive manufacturing job (202) has been carried out by the additive manufacturing printers (218, 220, 222).

Consider a second example in which the additive manufacturing job (202) is a batch job that includes a request for one or more of the additive manufacturing printers (218, 220, 222) to produce two plastic balls. In such an example, the first segment (214) of the additive manufacturing job (202) would result in the production of the first plastic ball and the second segment (216) of the additive manufacturing job (202) would result in the production of the second plastic ball. Carrying out each segment (214, 216) of the additive manufacturing job (202) would result in the production of two plastic balls, such that the entire additive manufacturing job (202) has been carried out by the additive manufacturing printers (218, 220, 222).

In the example method depicted in FIG. 2, identifying (210), for each of a plurality of segments (214, 216) of the additive manufacturing job (202), one or more additive manufacturing printers (218, 220, 222) capable of servicing the segment (214, 216) of the additive manufacturing job (202) is carried out in dependence upon the service requirements for the additive manufacturing job (202) and the service capabilities for the plurality of additive manufacturing printers (218, 220, 222). One or more additive manufacturing printers (218, 220, 222) capable of servicing a particular segment (214, 216) of the additive manufacturing job (202) may be identified (210) in dependence upon the service requirements for the additive manufacturing job (202) and the service capabilities for the plurality of additive manufacturing printers (218, 220, 222) by comparing the service capabilities for a particular additive manufacturing printer (218, 220, 222) to the service requirements for the additive manufacturing job (202) to determine whether the particular additive manufacturing printer (218, 220, 222) can execute a particular segment (214, 216) of the additive manufacturing job (202) in accordance with the service requirements for the service requirements for the additive manufacturing job (202).

Consider an example in which the service requirements for the additive manufacturing job (202) indicate that a physical, three-dimensional object that is to be produced by executing the additive manufacturing job (202) will be made of rubber. In such an example, the service capabilities for each additive manufacturing printer (218, 220, 222) may be examined to determine whether the additive manufacturing printer (218, 220, 222) can print using rubber. Those additive manufacturing printers (218, 220, 222) that can print using rubber may be identified (210) as being capable of servicing the segment (214, 216) of the additive manufacturing job (202). Likewise, those additive manufacturing printers (218, 220, 222) that cannot print using rubber will not be identified (210) as being capable of servicing the segment (214, 216) of the additive manufacturing job (202).

Readers will appreciate that additional service capabilities for a particular additive manufacturing printer (218, 220, 222) may be compared to additional service requirements for the additive manufacturing job (202) to determine whether the particular additive manufacturing printer (218, 220, 222) can execute a particular segment (214, 216) of the additive manufacturing job (202) in accordance with the service requirements for the additive manufacturing job (202). For example, if the service requirements for the additive manufacturing job (202) specify a desired completion time for the additive manufacturing job (202), only the additive manufacturing printers (218, 220, 222) that can execute the additive manufacturing job (202) within the desired completion time may be identified (210) as being capable of servicing the segment (214, 216) of the additive manufacturing job (202).

The example method depicted in FIG. 2 also includes assigning (212) each segment (214, 216) of the additive manufacturing job (202) to one of the additive manufacturing printers (218, 220, 222) identified (210) as being capable of servicing the segment (214, 216) of the additive manufacturing job (202). In the example method depicted in FIG. 2, assigning (212) each segment (214, 216) of the additive manufacturing job (202) to one of the additive manufacturing printers (218, 220, 222) identified (210) as being capable of servicing the segment (214, 216) of the additive manufacturing job (202) may be carried out by selecting, from the additive manufacturing printers (218, 220, 222) identified (210) as being capable of servicing the segment (214, 216) of the additive manufacturing job (202), the additive manufacturing printer (218, 220, 222) with the best performance metrics. For example, the additive manufacturing printer (218, 220, 222) with the highest job throughput may be assigned (212) a segment (214, 216), the additive manufacturing printer (218, 220, 222) with the highest resolution may be assigned (212) a segment (214, 216), and so on. Alternatively, assigning (212) each segment (214, 216) of the additive manufacturing job (202) to one of the additive manufacturing printers (218, 220, 222) identified (210) as being capable of servicing the segment (214, 216) of the additive manufacturing job (202) may be carried out by selecting, from the additive manufacturing printers (218, 220, 222) identified (210) as being capable of servicing the segment (214, 216) of the additive manufacturing job (202), additive manufacturing printers (218, 220, 222) so as to distribute workloads and avoid prematurely wearing out the additive manufacturing printers (218, 220, 222). For example, the least recently used additive manufacturing printer (218, 220, 222) may be assigned (212) a segment (214, 216), the least frequently used additive manufacturing printer (218, 220, 222) may be assigned (212) a segment (214, 216), and so on. Readers will appreciate that assigning (212) each segment (214, 216) of the additive manufacturing job (202) to one of the additive manufacturing printers (218, 220, 222) identified (210) as being capable of servicing the segment (214, 216) of the additive manufacturing job (202) may be carried out in a variety of ways to implement a variety of objectives according to embodiments of the present invention.

In the example method depicted in FIG. 2, two or more of the additive manufacturing printers (218, 220, 222) are each assigned at least one distinct segment (214, 216) of the additive manufacturing job (202). In such a way, execution of the additive manufacturing job (202) may be distributed across multiple additive manufacturing printers (218, 220, 222). By distributing the execution of the additive manufacturing job (202) across multiple additive manufacturing printers (218, 220, 222), a wide array of benefits may be achieved. For example, the additive manufacturing job (202) may be completed in less time as different segments (214, 216) are executed concurrently, the three-dimensional object that is produced by executing the additive manufacturing job (202) may be of a higher quality as segments (214, 216) can be intelligently distributed to the additive manufacturing printer (218, 220, 222) that can best execute the segment (202), the wear and tear on specific additive manufacturing printers (218, 220, 222) may be reduced as workload is distributed across other additive manufacturing printers (218, 220, 222), and so on.

Although the example depicted in FIG. 2 illustrates assigning a first segment (214) of the additive manufacturing job (202) to a first additive manufacturing printer (218) and assigning a second segment (216) of the additive manufacturing job (202) to a second additive manufacturing printer (222), readers will appreciate that the additive manufacturing job (202) may be broken up into more than two segments (214, 216), and such segments (214, 216) may be distributed to more than two additive manufacturing printers (218, 220, 222). Embodiments of the present application are contemplated where many segments of the additive manufacturing job (202) are identified and distributed amongst a large number of additive manufacturing printers (218, 220, 222). Furthermore, one or more of the additive manufacturing printers (218, 220, 222) may be assigned multiple distinct segments of the additive manufacturing job (202), so long as two or more of the additive manufacturing printers (218, 220, 222) are each assigned at least one distinct segment (214, 216) of the additive manufacturing job (202).

Figure 3:
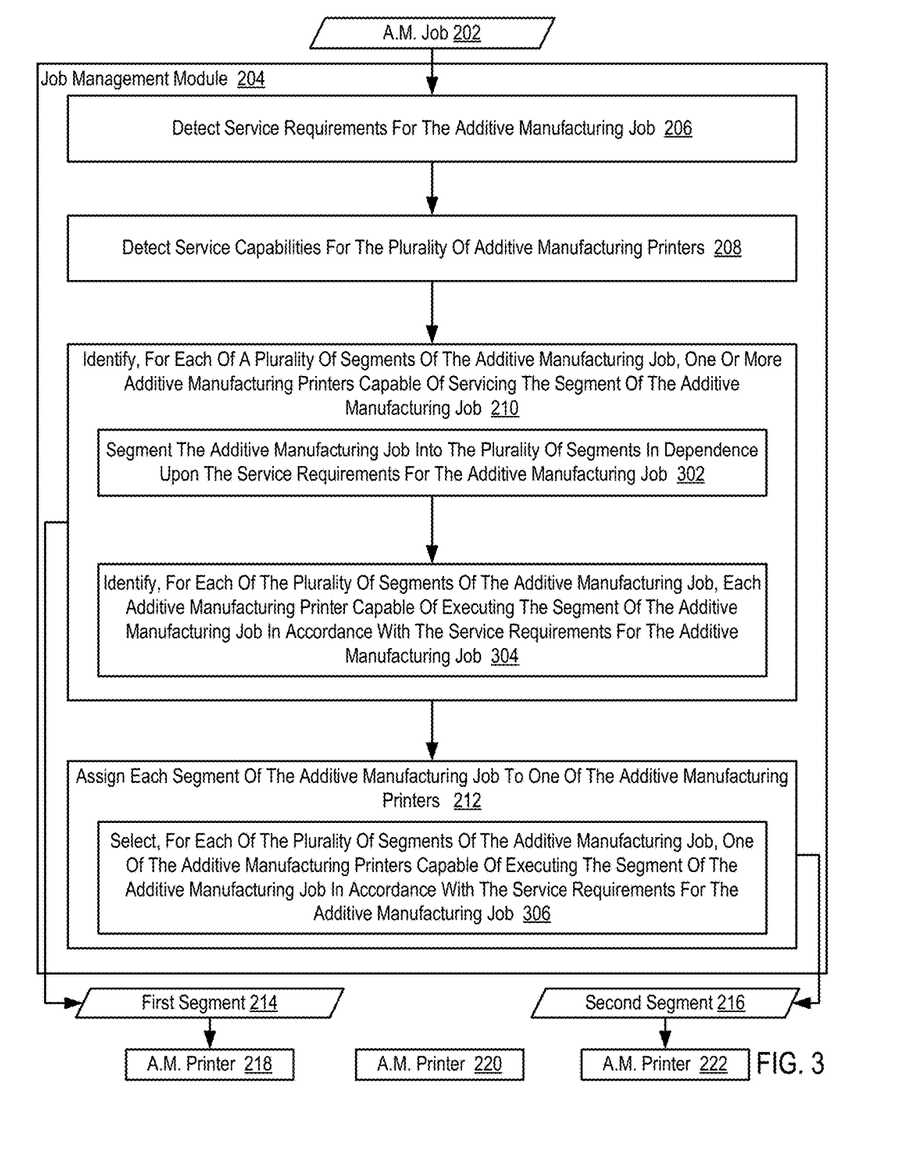
FIG. 3 sets forth a flow chart illustrating an additional example method for executing an additive manufacturing job by a plurality of additive manufacturing printers according to embodiments of the present invention.

For further explanation, FIG. 3 sets forth a flow chart illustrating a further example method for executing an additive manufacturing job by a plurality of additive manufacturing printers (218, 220, 222) according to embodiments of the present invention. The example method depicted in FIG. 3 is similar to the example method depicted in FIG. 2, as the example method depicted in FIG. 3 also includes detecting (206) service requirements for the additive manufacturing job (202), detecting (208) service capabilities for the plurality of additive manufacturing printers (218, 220, 222), identifying (210) one or more additive manufacturing printers (218, 220, 222) capable of servicing each segment (214, 216) of the additive manufacturing job (202), and assigning (212) each segment (214, 216) of the additive manufacturing job (202) to one of the additive manufacturing printers (218, 220, 222) identified (210) as being capable of servicing the segment (214, 216) of the additive manufacturing job (202).

In the example method depicted in FIG. 3, identifying (210) one or more additive manufacturing printers (218, 220, 222) capable of servicing each segment (214, 216) of the additive manufacturing job (202) can include segmenting (302) the additive manufacturing job (202) into the plurality of segments (214, 216) in dependence upon the service requirements for the additive manufacturing job (202). Segmenting (302) the additive manufacturing job (202) into the plurality of segments (214, 216) in dependence upon the service requirements for the additive manufacturing job (202) may be carried out, for example, by examining the service requirements for the additive manufacturing job (202) to identify distinct components of the additive manufacturing job (202). Components may be distinct, for example, if the components are made of different materials, if the components are pieces that must later be assembled, if the components require different print resolutions, if the components are distinct items in a batch printing job, and so on.

In the example method depicted in FIG. 3, identifying (210) one or more additive manufacturing printers (218, 220, 222) capable of servicing each segment (214, 216) of the additive manufacturing job (202) can also include identifying (304), for each of the plurality of segments (214, 216) of the additive manufacturing job (202), each additive manufacturing printer (218, 220, 222) capable of executing the segment of the additive manufacturing job (202) in accordance with the service requirements for the additive manufacturing job (202). Identifying (304) each additive manufacturing printer (218, 220, 222) capable of executing each segment of the additive manufacturing job (202) in accordance with the service requirements for the additive manufacturing job (202) may be carried out, for example, by comparing the service requirements that are specific to a particular segment (214, 216) with the service capabilities for the each of the additive manufacturing printers (218, 220, 222).

Consider the example described above in which the additive manufacturing job (202) includes a request for one or more of the additive manufacturing printers (218, 220, 222) to produce a mirror that includes a reflective coating applied to a substrate. In such an example, the service requirements (e.g., the computer model and related information) for the additive manufacturing job (202) may specify that a ½ inch glass substrate is to be constructed and that a ¼ inch reflective coating is to be applied to the substrate. In such an example, the additive manufacturing job (202) may be segmented (302) into two segments (214, 216)—a first segment (214) to produce a ½ inch glass substrate and a second segment (216) to layer a ¼ inch reflective coating on a substrate provided to the additive manufacturing printer that is to carry out the second segment (216). In such an example, identifying (304) each additive manufacturing printer (218, 220, 222) capable of executing each segment of the additive manufacturing job (202) in accordance with the service requirements for the additive manufacturing job (202) may be carried out by examining the service capabilities for the each of the additive manufacturing printers (218, 220, 222) to identify those printers that are capable of producing a ½ inch glass substrate and also examining the service capabilities for the each of the additive manufacturing printers (218, 220, 222) to identify those printers that are capable of layering a ¼ inch reflective coating on a substrate that is provided to the additive manufacturing printers.

In the example method depicted in FIG. 3, assigning (212) each segment (214, 216) of the additive manufacturing job (202) to one of the additive manufacturing printers (218, 220, 222) identified (210) as being capable of servicing the segment (214, 216) of the additive manufacturing job (202) can also include selecting (306), for each of the plurality of segments (214, 216) of the additive manufacturing job (202), one of the additive manufacturing printers (218, 220, 222) capable of executing the segment of the additive manufacturing job (202) in accordance with the service requirements for the additive manufacturing job (202). If only one of the additive manufacturing printers (218, 220, 222) is identified (304) as being capable of executing a particular segment (214, 216) of the additive manufacturing job (202) in accordance with the service requirements for the additive manufacturing job (202), that printer may be selected (306). If multiple additive manufacturing printers (218, 220, 222) are identified (304) as being capable of executing a particular segment (214, 216) of the additive manufacturing job (202) in accordance with the service requirements for the additive manufacturing job (202), however, additional selection rules may be applied when selecting a particular additive manufacturing printer from the pool of printers identified (304) as being capable of executing a particular segment (214, 216) of the additive manufacturing job (202) in accordance with the service requirements for the additive manufacturing job (202). For example, an additive manufacturing printer that is not executing any of the other segments of an additive manufacturing job may be selected (306), the additive manufacturing printer that has been least recently used may be selected (306), the additive manufacturing printer that can complete the segment in the shortest amount of time may be selected, the additive manufacturing with the shortest print queue of pending jobs may be selected, and so on.

Figure 4:
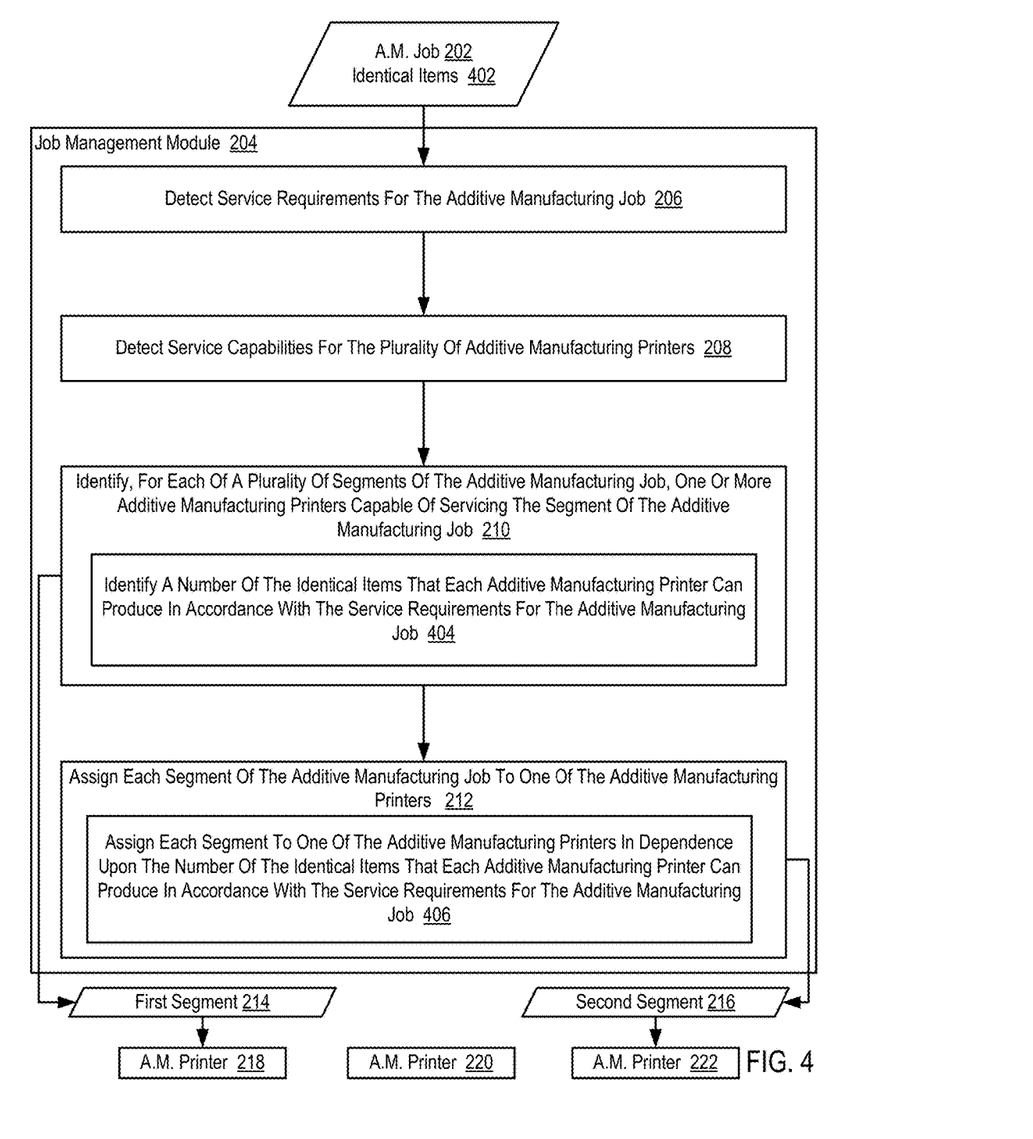
FIG. 4 sets forth a flow chart illustrating an additional example method for executing an additive manufacturing job by a plurality of additive manufacturing printers according to embodiments of the present invention.

For further explanation, FIG. 4 sets forth a flow chart illustrating a further example method for executing an additive manufacturing job by a plurality of additive manufacturing printers (218, 220, 222) according to embodiments of the present invention. The example method depicted in FIG. 4 is similar to the example method depicted in FIG. 2, as the example method depicted in FIG. 4 also includes detecting (206) service requirements for the additive manufacturing job (202), detecting (208) service capabilities for the plurality of additive manufacturing printers (218, 220, 222), identifying (210) one or more additive manufacturing printers (218, 220, 222) capable of servicing each segment (214, 216) of the additive manufacturing job (202), and assigning (212) each segment (214, 216) of the additive manufacturing job (202) to one of the additive manufacturing printers (218, 220, 222) identified (210) as being capable of servicing the segment (214, 216) of the additive manufacturing job (202).

In the example method depicted in FIG. 4, the additive manufacturing job (202) specifies a plurality of identical items (402) to be produced. The additive manufacturing job (202) may specify a plurality of identical items (402) to be produced, for example, by including a computer model of the items to be produced by executing the additive manufacturing job (202) and also including a populated value field in the additive manufacturing job (202) that specifies the number of items depicted in such computer models should be produced. For example, the additive manufacturing job (202) may include a computer model of a rubber ball and a value of '50' contained in a value field to represent an instruction to produce 50 rubber balls. In such a way, the additive manufacturing job (202) effectively designates a batch job where multiple copies of the same item are to be produced.

In the example method depicted in FIG. 4, identifying (210) one or more additive manufacturing printers (218, 220, 222) capable of servicing each segment (214, 216) of the additive manufacturing job (202) further comprises identifying (404) a number of the identical items (402) that each additive manufacturing printer (218, 220, 222) can produce in accordance with the service requirements for the additive manufacturing job (202). Identifying (404) a number of the identical items (402) that each additive manufacturing printer (218, 220, 222) can produce in accordance with the service requirements for the additive manufacturing job (202) may be carried out, for example, by dividing a desired completion time specified in the additive manufacturing job (202) by the amount of time required by each additive manufacturing printer (218, 220, 222) to produce each copy of the identical items (402).

Consider the example described above in which the additive manufacturing job (202) represents an instruction to produce 50 rubber balls. In such an example, assume that the service requirements for the additive manufacturing job (202) indicate a desired completion time of 4 hours. In such an example, if the service capabilities for a particular additive manufacturing printer (218) indicate that the additive manufacturing printer (218) can produce one of the rubber balls in 15 minutes, the number of the identical items (402) that the additive manufacturing printer (218) could produce in accordance with the service requirements for the additive manufacturing job (202) is equal to 16 (240 minutes divided by 15 minutes). In other words, the additive manufacturing printer (218) that can produce one of the rubber balls in 15 minutes can produce 16 rubber balls within the 4 hour desired completion time specified in the service requirements for the additive manufacturing job (202). The remaining 34 rubber balls that would need to be produced to execute the additive manufacturing job (202) in accordance with the service requirements for the additive manufacturing job (202) would need to be produced by another additive manufacturing printer (220, 222).

Readers will appreciate that identifying (404) a number of the identical items (402) that each additive manufacturing printer (218, 220, 222) can produce in accordance with the service requirements for the additive manufacturing job (202) may be carried out in other ways. For example, the amount of material required to produce a single copy of the identical items may be compared to the amount of such material that is available to a particular additive manufacturing printer (218, 220, 222). Likewise, the amount of time required to produce a single copy of the identical items may be compared to the amount of time that a particular additive manufacturing printer (218, 220, 222) can dedicate to performing a particular additive manufacturing job (202). Readers will appreciate that identifying (404) a number of the identical items (402) that each additive manufacturing printer (218, 220, 222) can produce in accordance with the service requirements for the additive manufacturing job (202) may be carried out in many other ways in accordance with embodiments of the present invention.

In the example method depicted in FIG. 4, assigning (212) each segment (214, 216) of the additive manufacturing job (202) to one of the additive manufacturing printers (218, 220, 222) identified (210) as being capable of servicing the segment (214, 216) of the additive manufacturing job (202) includes assigning (406) each segment (214, 216) to one of the additive manufacturing printers (218, 220, 222) in dependence upon the number of the identical items (402) that each additive manufacturing printer (218, 220, 222) can produce in accordance with the service requirements for the additive manufacturing job (202). Assigning (406) each segment (214, 216) to one of the additive manufacturing printers (218, 220, 222) in dependence upon the number of the identical items (402) that each additive manufacturing printer (218, 220, 222) can produce in accordance with the service requirements for the additive manufacturing job (202) may be carried out, for example, by assigning a number of segments (214, 216) to a particular additive manufacturing printer (218) such that the additive manufacturing printer (218) produces the maximum number of identical items (402) that it can produce in accordance with the service requirements for the additive manufacturing job (202).

Consider the example described above in which the additive manufacturing job (202) represents an instruction to produce 50 rubber balls within a desired completion time of 4 hours and a particular additive manufacturing printer (218) can produce 16 rubber balls in the desired completion time of 4 hours. In such an example, assigning (406) one or more segments (214, 216) to the additive manufacturing printer (218) in dependence upon the number of the identical items (402) that the additive manufacturing printer (218) can produce in accordance with the service requirements for the additive manufacturing job (202) would result in the additive manufacturing printer (218) being assigned segments requiring that the additive manufacturing printer (218) produce 16 rubber balls.

Readers will appreciate that in other embodiments, assigning (406) each segment (214, 216) to one of the additive manufacturing printers (218, 220, 222) in dependence upon the number of the identical items (402) that each additive manufacturing printer (218, 220, 222) can produce in accordance with the service requirements for the additive manufacturing job (202) may be carried out in other ways. For example, if the additive manufacturing printers (218, 220, 222) can cumulatively produce more of the identical items (402) that are required by the additive manufacturing job (202), least recently used additive manufacturing printers (218, 220, 222) may be assigned a higher portion of the workload, each additive manufacturing printer (218, 220, 222) may be assigned an equal workload, each additive manufacturing printer (218, 220, 222) may be assigned an equal workload relative to their individual capabilities, and so on. Readers will appreciate that assigning (406) each segment (214, 216) to one of the additive manufacturing printers (218, 220, 222) in dependence upon the number of the identical items (402) that each additive manufacturing printer (218, 220, 222) can produce in accordance with the service requirements for the additive manufacturing job (202) may be carried out in many other ways in accordance with embodiments of the present invention.

Figure 5:
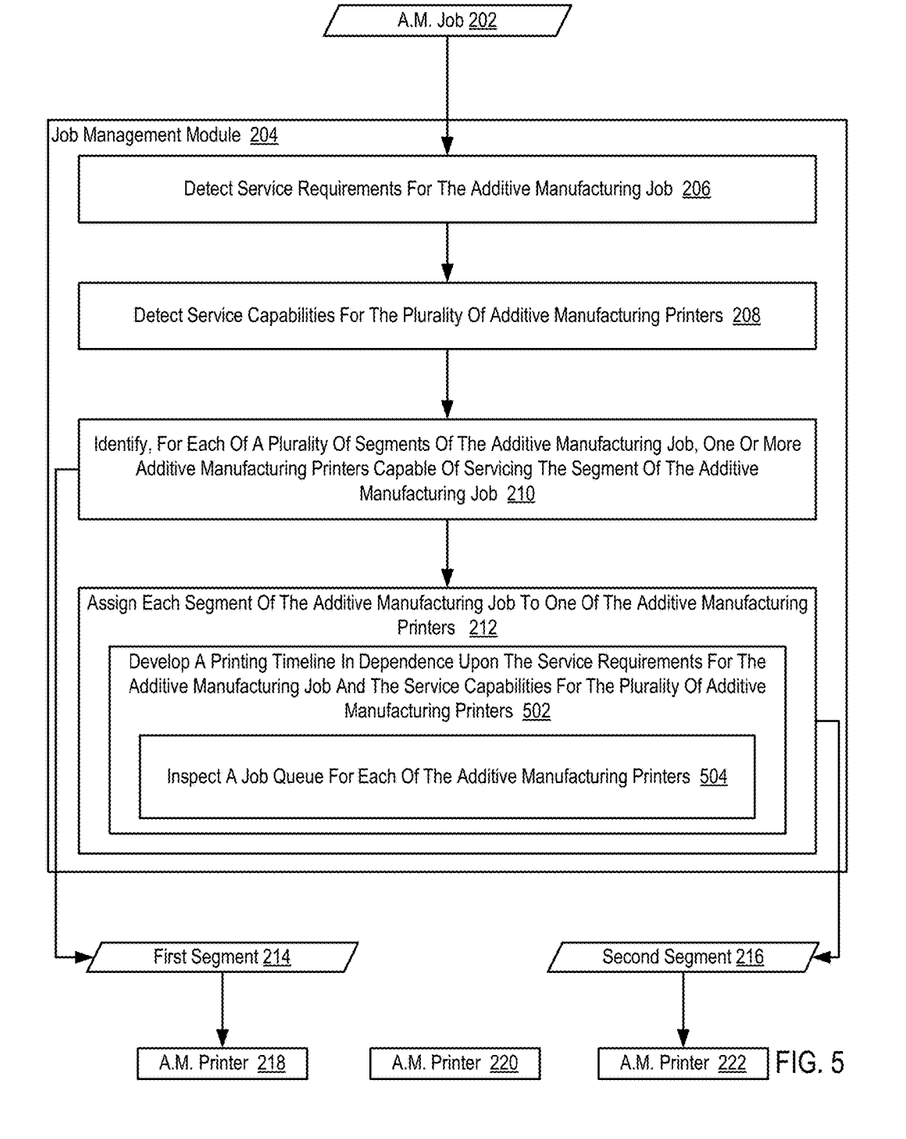
FIG. 5 sets forth a flow chart illustrating an additional example method for executing an additive manufacturing job by a plurality of additive manufacturing printers according to embodiments of the present invention.

For further explanation, FIG. 5 sets forth a flow chart illustrating a further example method for executing an additive manufacturing job by a plurality of additive manufacturing printers (218, 220, 222) according to embodiments of the present invention. The example method depicted in FIG. 5 is similar to the example method depicted in FIG. 2, as the example method depicted in FIG. 5 also includes detecting (206) service requirements for the additive manufacturing job (202), detecting (208) service capabilities for the plurality of additive manufacturing printers (218, 220, 222), identifying (210) one or more additive manufacturing printers (218, 220, 222) capable of servicing each segment (214, 216) of the additive manufacturing job (202), and assigning (212) each segment (214, 216) of the additive manufacturing job (202) to one of the additive manufacturing printers (218, 220, 222) identified (210) as being capable of servicing the segment (214, 216) of the additive manufacturing job (202).

In the example method depicted in FIG. 5, assigning (212) each segment (214, 216) of the additive manufacturing job (202) to one of the additive manufacturing printers (218, 220, 222) identified (210) as being capable of servicing the segment (214, 216) of the additive manufacturing job (202) can include developing (502) a printing timeline in dependence upon the service requirements for the additive manufacturing job (202) and the service capabilities for the plurality of additive manufacturing printers (218, 220, 222). The printing timeline can include information such as the order in which the segments (214, 216) of the additive manufacturing job (202) are to be executed, the expected times at which the execution of the segments (214, 216) of the additive manufacturing job (202) are to begin and end, an identification of the additive manufacturing printers (218, 220, 222) that will execute each segment (214, 216) of the additive manufacturing job (202), and so on. In such a way, the printing timeline represents a detailed schedule for executing each of the segments (214, 216) of the additive manufacturing job (202).

In the example method depicted in FIG. 5, developing (502) a printing timeline in dependence upon the service requirements for the additive manufacturing job (202) and the service capabilities for the plurality of additive manufacturing printers (218, 220, 222) may be carried out by identifying the order in which each segment (214, 216) of the additive manufacturing job (202) should be executed. In some instances, two or more segments (214, 216) may be executed in parallel such that the order in which each segment (214, 216) of the additive manufacturing job (202) should be executed can include executing the two or more segments (214, 216) that may be executed in parallel at the same time. Developing (502) the printing timeline in dependence upon the service requirements for the additive manufacturing job (202) and the service capabilities for the plurality of additive manufacturing printers (218, 220, 222) may be further carried out by identifying the time at which the execution of each segment (214, 216) of the additive manufacturing job (202) can begin and end. The time at which the execution of each segment (214, 216) of the additive manufacturing job (202) can begin and end may be impacted by the presence of other print jobs in the job queue of a particular printer. As such, developing (502) a printing timeline in dependence upon the service requirements for the additive manufacturing job (202) and the service capabilities for the plurality of additive manufacturing printers (218, 220, 222) can therefore include inspecting (504) a job queue for each of the additive manufacturing printers (218, 220, 222).

Example embodiments of the present invention are described largely in the context of a fully functional computer system for executing an additive manufacturing job by a plurality of additive manufacturing printers, as well as methods for executing an additive manufacturing job by a plurality of additive manufacturing printers. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

The computer program product may be embodied as a computer readable storage medium (or media) having computer program instructions stored thereon. Such computer program instructions cause the computer processor to carry out aspects of the present invention when executed by computing machinery such a computer processor. Such a computer readable storage medium may be embodied, for example, as a tangible device that can retain and store instructions for use by an instruction execution device. The computer readable storage medium may be, for example, an electronic storage device, a magnetic storage device, an optical storage device, an electromagnetic storage device, a semiconductor storage device, or any suitable combination of the foregoing. A non-exhaustive list of more specific examples of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from the computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
    by first program instructions on a first computing device,
        detecting service requirements for an additive manufacturing job;
        detecting service capabilities for a plurality of additive manufacturing printers;
        identifying, for each of a plurality of segments of the additive manufacturing job, one or more additive manufacturing printers capable of servicing the segment of the additive manufacturing job in dependence upon the service requirements for the additive manufacturing job and the service capabilities for the plurality of additive manufacturing printers; and
        assigning each segment of the additive manufacturing job to one of the additive manufacturing printers identified as being capable of servicing the segment of the additive manufacturing job, wherein two or more of the additive manufacturing printers are each assigned at least one distinct segment of the additive manufacturing job, wherein assigning each segment of the additive manufacturing job to one of the additive manufacturing printers identified as being capable of servicing the segment of the additive manufacturing job further comprises:
            developing, in dependence upon the service requirements for the additive manufacturing job and the service capabilities for the plurality of additive manufacturing printers, a printing timeline comprising an order in which the plurality of segments are to be executed.

2. The method of claim 1 wherein identifying, for each of the plurality of segments of the additive manufacturing job, one or more additive manufacturing printers capable of servicing the segment of the additive manufacturing job further comprises:
    segmenting the additive manufacturing job into the plurality of segments in dependence upon the service requirements for the additive manufacturing job; and
    identifying, for each of the plurality of segments of the additive manufacturing job, each additive manufacturing printer capable of executing the segment of the additive manufacturing job in accordance with the service requirements for the additive manufacturing job.

3. The method of claim 2 wherein assigning each segment of the additive manufacturing job to one of the additive manufacturing printers identified as being capable of servicing the segment of the additive manufacturing job further comprises selecting, for each of the plurality of segments of the additive manufacturing job, one of the additive manufacturing printers capable of executing the segment of the additive manufacturing job in accordance with the service requirements for the additive manufacturing job.

4. The method of claim 1 wherein:
    the additive manufacturing job specifies a plurality of identical items to be produced;
    identifying, for each of a plurality of segments of the additive manufacturing job, one or more additive manufacturing printers capable of servicing the segment of the additive manufacturing job further comprises identifying a number of the identical items that each additive manufacturing printer can produce in accordance with the service requirements for the additive manufacturing job; and
    assigning each segment of the additive manufacturing job to one of the additive manufacturing printers identified as being capable of servicing the segment of the additive manufacturing job includes assigning each segment to one of the additive manufacturing printers in dependence upon the number of the identical items that each additive manufacturing printer can produce in accordance with the service requirements for the additive manufacturing job.

5. The method of claim 1 wherein developing a printing timeline in dependence upon the service requirements for the additive manufacturing job and the service capabilities for the plurality of additive manufacturing printers further comprises inspecting a job queue for each of the additive manufacturing printers.

6. The method of claim 1 wherein detecting service requirements for the additive manufacturing job further comprises processing a computer model of an object to be produced by executing the additive manufacturing job.

7. An apparatus comprising a computer processor, a computer memory operatively coupled to the computer processor, the computer memory having disposed within it computer program instructions that, when executed by the computer processor, cause the apparatus to carry out the steps of:
    detecting service requirements for an additive manufacturing job;
    detecting service capabilities for a plurality of additive manufacturing printers;
    identifying, for each of a plurality of segments of the additive manufacturing job, one or more additive manufacturing printers capable of servicing the segment of the additive manufacturing job in dependence upon the service requirements for the additive manufacturing job and the service capabilities for the plurality of additive manufacturing printers; and
    assigning each segment of the additive manufacturing job to one of the additive manufacturing printers identified as being capable of servicing the segment of the additive manufacturing job, wherein two or more of the additive manufacturing printers are each assigned at least one distinct segment of the additive manufacturing job, wherein assigning each segment of the additive manufacturing job to one of the additive manufacturing printers identified as being capable of servicing the segment of the additive manufacturing job further comprises:
        developing, in dependence upon the service requirements for the additive manufacturing job and the service capabilities for the plurality of additive manufacturing printers, a printing timeline comprising an order in which the plurality of segments are to be executed.

8. The apparatus of claim 7 wherein identifying, for each of the plurality of segments of the additive manufacturing job, one or more additive manufacturing printers capable of servicing the segment of the additive manufacturing job further comprises:
    segmenting the additive manufacturing job into the plurality of segments in dependence upon the service requirements for the additive manufacturing job; and identifying, for each of the plurality of segments of the additive manufacturing job, each additive manufacturing printer capable of executing the segment of the additive manufacturing job in accordance with the service requirements for the additive manufacturing job.

9. The apparatus of claim 8 wherein assigning each segment of the additive manufacturing job to one of the additive manufacturing printers identified as being capable of servicing the segment of the additive manufacturing job further comprises selecting, for each of the plurality of segments of the additive manufacturing job, one of the additive manufacturing printers capable of executing the segment of the additive manufacturing job in accordance with the service requirements for the additive manufacturing job.

10. The apparatus of claim 7 wherein:
the additive manufacturing job specifies a plurality of identical items to be produced;
identifying, for each of a plurality of segments of the additive manufacturing job, one or more additive manufacturing printers capable of servicing the segment of the additive manufacturing job further comprises identifying a number of the identical items that each additive manufacturing printer can produce in accordance with the service requirements for the additive manufacturing job; and
assigning each segment of the additive manufacturing job to one of the additive manufacturing printers identified as being capable of servicing the segment of the additive manufacturing job includes assigning each segment to one of the additive manufacturing printers in dependence upon the number of the identical items that each additive manufacturing printer can produce in accordance with the service requirements for the additive manufacturing job.

11. The apparatus of claim 7 wherein developing a printing timeline in dependence upon the service requirements for the additive manufacturing job and the service capabilities for the plurality of additive manufacturing printers further comprises inspecting a job queue for each of the additive manufacturing printers.

12. A computer program product disposed upon a computer readable medium, the computer program product comprising computer program instructions that, when executed, cause a computer to carry out the steps of:
detecting service requirements for an additive manufacturing job;
detecting service capabilities for a plurality of additive manufacturing printers;
identifying, for each of a plurality of segments of the additive manufacturing job, one or more additive manufacturing printers capable of servicing the segment of the additive manufacturing job in dependence upon the service requirements for the additive manufacturing job and the service capabilities for the plurality of additive manufacturing printers; and
assigning each segment of the additive manufacturing job to one of the additive manufacturing printers identified as being capable of servicing the segment of the additive manufacturing job, wherein two or more of the additive manufacturing printers are each assigned at least one distinct segment of the additive manufacturing job, wherein assigning each segment of the additive manufacturing job to one of the additive manufacturing printers identified as being capable of servicing the segment of the additive manufacturing job further comprises:
developing, in dependence upon the service requirements for the additive manufacturing job and the service capabilities for the plurality of additive manufacturing printers, a printing timeline comprising an order in which the plurality of segments are to be executed.

13. The computer program product of claim 12 wherein identifying, for each of the plurality of segments of the additive manufacturing job, one or more additive manufacturing printers capable of servicing the segment of the additive manufacturing job further comprises:
segmenting the additive manufacturing job into the plurality of segments in dependence upon the service requirements for the additive manufacturing job; and
identifying, for each of the plurality of segments of the additive manufacturing job, each additive manufacturing printer capable of executing the segment of the additive manufacturing job in accordance with the service requirements for the additive manufacturing job.

14. The computer program product of claim 13 wherein assigning each segment of the additive manufacturing job to one of the additive manufacturing printers identified as being capable of servicing the segment of the additive manufacturing job further comprises selecting, for each of the plurality of segments of the additive manufacturing job, one of the additive manufacturing printers capable of executing the segment of the additive manufacturing job in accordance with the service requirements for the additive manufacturing job.

15. The computer program product of claim 12 wherein:
the additive manufacturing job specifies a plurality of identical items to be produced;
identifying, for each of a plurality of segments of the additive manufacturing job, one or more additive manufacturing printers capable of servicing the segment of the additive manufacturing job further comprises identifying a number of the identical items that each additive manufacturing printer can produce in accordance with the service requirements for the additive manufacturing job; and
assigning each segment of the additive manufacturing job to one of the additive manufacturing printers identified as being capable of servicing the segment of the additive manufacturing job includes assigning each segment to one of the additive manufacturing printers in dependence upon the number of the identical items that each additive manufacturing printer can produce in accordance with the service requirements for the additive manufacturing job.

16. The computer program product of claim 12 wherein developing a printing timeline in dependence upon the service requirements for the additive manufacturing job and the service capabilities for the plurality of additive manufacturing printers further comprises inspecting a job queue for each of the additive manufacturing printers.

17. The computer program product of claim 12 wherein detecting service requirements for the additive manufacturing job further comprises processing a computer model of an object to be produced by executing the additive manufacturing job.

* * * * *